US008938706B2

(12) United States Patent
Das

(10) Patent No.: US 8,938,706 B2
(45) Date of Patent: *Jan. 20, 2015

(54) PROVIDING CUSTOMIZED VISUALIZATION OF APPLICATION BINARY INTERFACE/APPLICATION PROGRAMMING INTERFACE-RELATED INFORMATION

(75) Inventor: Kushal Das, West Bengal (IN)

(73) Assignee: Red Hat, Inc., Raleigh, NC (US)

( * ) Notice: Subject to any disclaimer, the term of this patent is extended or adjusted under 35 U.S.C. 154(b) by 726 days.

This patent is subject to a terminal disclaimer.

(21) Appl. No.: 12/953,023

(22) Filed: Nov. 23, 2010

(65) Prior Publication Data

US 2012/0131563 A1 May 24, 2012

(51) Int. Cl.
*G06F 9/44* (2006.01)

(52) U.S. Cl.
USPC .......................................... 717/101

(58) Field of Classification Search
USPC ......... 717/130, 120, 158, 162, 177, 101, 109; 709/201, 223; 707/603, 736; 345/419; 703/22; 702/186; 726/22
IPC ....... G06F 17/30722,17/30887; H04L 41/5009, H04L 41/509
See application file for complete search history.

(56) References Cited

U.S. PATENT DOCUMENTS

| | | | |
|---|---|---|---|
| 5,878,429 A | 3/1999 | Morris et al. | |
| 5,923,882 A | 7/1999 | Ho et al. | |
| 6,047,362 A | 4/2000 | Zucker | |
| 6,260,075 B1 | 7/2001 | Cabrero et al. | |
| 6,771,290 B1 * | 8/2004 | Hoyle | 715/745 |
| 7,051,038 B1 * | 5/2006 | Yeh et al. | 707/603 |
| 7,203,946 B2 | 4/2007 | Johnson et al. | |
| 7,389,311 B1 | 6/2008 | Crescenti et al. | |
| 7,458,022 B2 | 11/2008 | Ramarao | |
| 7,739,282 B1 * | 6/2010 | Smith et al. | 707/736 |
| 7,774,757 B1 | 8/2010 | Awasthi et al. | |
| 7,945,902 B1 | 5/2011 | Sahoo | |
| 7,971,183 B2 | 6/2011 | Grechanik et al. | |
| 7,971,184 B2 | 6/2011 | Grechanik et al. | |
| 7,979,846 B2 | 7/2011 | Grechanik et al. | |
| 7,984,429 B2 | 7/2011 | Hunt | |
| 8,204,809 B1 | 6/2012 | Wise | |
| 8,776,036 B2 | 7/2014 | Das | |

(Continued)

OTHER PUBLICATIONS

Ryan Lerch, "Red Hat Enterprise Linux 5.3", Release Notes, copyright 2008, pp. 1-240 <Release_Notes_08.pdf>.*

(Continued)

*Primary Examiner* — Tuan A Vu
(74) *Attorney, Agent, or Firm* — Lowenstein Sandler LLP

(57) ABSTRACT

A mechanism for providing customized visualization of Application Binary Interface-related information is described. A method of embodiments of the invention includes querying a database storing interface provisioning details and interface usage details relating to application binary interfaces (ABIs) associated with shared libraries provided by an operating system running on a computer system. The database further stores comparison results obtained from comparing the interface provisioning details with the interface usage details. The method further includes extracting a set of information from the database, and customizing visualization representation of the set of information. The set of information is composed of any part or all of the interface provisioning details, the interface usage details, and the comparison results.

20 Claims, 6 Drawing Sheets

(56) References Cited

U.S. PATENT DOCUMENTS

| | | | |
|---|---|---|---|
| 2003/0217193 | A1 | 11/2003 | Thurston et al. |
| 2003/0229890 | A1 | 12/2003 | Lau et al. |
| 2005/0138111 | A1* | 6/2005 | Aton et al. ............... 709/201 |
| 2006/0059253 | A1* | 3/2006 | Goodman et al. .......... 709/223 |
| 2006/0069961 | A1 | 3/2006 | Kalyanaraman |
| 2006/0141983 | A1* | 6/2006 | Jagannathan et al. ....... 455/406 |
| 2006/0184930 | A1 | 8/2006 | Fuente et al. |
| 2007/0011667 | A1 | 1/2007 | Subbiah et al. |
| 2007/0056037 | A1* | 3/2007 | Focke et al. .............. 726/22 |
| 2007/0168957 | A1* | 7/2007 | Li et al. .................. 717/120 |
| 2007/0294673 | A1* | 12/2007 | Guerrera et al. ........... 717/130 |
| 2008/0244177 | A1 | 10/2008 | Crescenti et al. |
| 2009/0037896 | A1 | 2/2009 | Grechanik et al. |
| 2009/0276771 | A1* | 11/2009 | Nickolov et al. .......... 717/177 |
| 2010/0195503 | A1* | 8/2010 | Raleigh ................... 370/235 |
| 2010/0226594 | A1* | 9/2010 | Mikawa ................... 382/309 |
| 2010/0306737 | A1 | 12/2010 | Hamilton, II et al. |
| 2010/0318947 | A1 | 12/2010 | Motiani et al. |
| 2012/0131538 | A1 | 5/2012 | Das |
| 2012/0131539 | A1 | 5/2012 | Das |
| 2012/0131564 | A1 | 5/2012 | Das |
| 2012/0209895 | A1 | 8/2012 | He et al. |
| 2012/0253662 | A1* | 10/2012 | Iguchi et al. .............. 701/428 |

OTHER PUBLICATIONS

"ELF-64 Object File Format" retrieved from the Internet at http://downloads.openwatcom.org/ftp/devel/docs/elf-64-gen.pdf. May 27, 1998 Version 1.5, Draft 2. 18 pages.

Library Usage (Published Jul. 12, 2008) retrieved from http://www.the-interweb.com/bdump/misc/top2000.txt on Feb. 28, 2013, 22 pages.

Library Usage (Published Jul. 12, 2008) retrieved from http://www.the-interweb.com/serendipity/index.php?/archives/109-Some-Win32-API-usage-statistics.html on May 24, 2013, 2 pages.

Library Rank List (Published 2009) retrieved from http://www.the-interweb.com/bdump/misc/top2000.txt on Mar. 8, 2013, 4 pages.

Richard S. Piepho et al., A Comparison of Risc Architectures, IEEE 1989, [Retrieved on Oct. 2, 2012]. Retrieved from the internet: <URL: http://ieeexplore.ieee.org/stamp/stamp.jsp?tp=&arnumber=31487> 12 pages (51-62).

Daniel Silakov et al., Improving Portability of Linux Application by Early Detection of Interoperability Issues, 2010 [Retrieved on Oct. 2, 2012]. Retrieved from the internet: <URL: http://www.springerlink.com/content/6271n751523807p2/fulltext.pdf> 14 Pages (357-370).

USPTO; Office Action for U.S. Appl. No. 12/953,285, mailed May 9, 2013.

USPTO, Office Action for U.S. Appl. No. 12/953,286 mailed Nov. 1, 2012.

USPTP, Office Action for U.S. Appl. No. 12/953,286 mailed Apr. 29, 2013.

USPTO, Notice of Allowance for U.S. Appl. No. 12/953,084 mailed Dec. 21, 2012.

Google Books, "Leveraging Applications of Formal Methods, Verification, and Validation: 4th International Symposium on Leveraging Applications," ISoLA 2010, Heraklion, Crete, Greece, Oct. 18-21, 2010, Proceedings; published Dec. 23, 2010; retrieved from http://books.google.com/books?id=j8PFfxikBZQC on Dec. 2, 2013.

Springer Link, "Daniel Silakov et al., Improving Portability of Linux Application by Early Detection of Interoperability Issues: 4th International Symposium on Leveraging Applications," ISoLA 2010, Heraklion, Crete, Greece, Oct. 18-21, 2010, Proceedings, Part II; published 2010;retrieved from http://link.springer.com/chapter/10.1007%2F978-3-642-16561-0_34 on Dec. 2, 2013.

Ulrich Drepper et al., The Native POSIX Thread Library for Linux, 2003, [Retrieved on Jul. 11, 2013]. Retrieved from the internet: <URL: http://www.cs.utexas.edu/~witchel/372/lectures/POSIX_Linux_Threading.pdf> 20 pages (1-20).

USPTO; Office Action for U.S. Appl. No. 12/953,285, mailed Oct. 1, 2013.

USPTO; Office Action for U.S. Appl. No. 12/953,285, mailed Dec. 17, 2013.

USPTO, Office Action for U.S. Appl. No. 12/953,286 mailed Aug. 9, 2013.

USPTO, Notice of Allowance for U.S. Appl. No. 12/953,084 mailed Dec. 4, 2013.

USPTO, Notice of Allowance for U.S. Appl. No. 12/953,286 mailed Mar. 12, 2014.

Eijkhout, Victor et al. "A Standard and Software for Numberical Metadata", Feb. 2009. [Retrieved on Mar. 5, 2014]. Retrieved from the internet: <URL: http://dl.acm.org/citation.cfm?id=1462174> 20 Paage (1-20).

Wolpers, Martin et al. Tracking Actual Usage: the Attention Metadata Approach, 2007 [Retrieved Mar. 5, 2014]. Retrieved from the internet: <URL: http://eds.a.ebscohost.com/ehost/pdfviewer?sid+2f23b7ed-330f-47b5-857f-0f3355941e52%40sessionmgr4001&,vid=2&,hid-4102> 17 pages. (106-121).

USPTO; Notice of Allowance for U.S. Appl. No. 12/953,285, mailed Jun. 17, 2014.

USPTO, Notice of Allowance for U.S. Appl. No. 12/953,286 mailed Jul. 16, 2014.

USPTO, Notice of Allowance for U.S. Appl. No. 12/953,084 mailed Apr. 22, 2014.

\* cited by examiner

PROVIDING CUSTOMIZED VISUALIZATION OF APPLICATION BINARY INTERFACE/APPLICATION PROGRAMMING INTERFACE-RELATED INFORMATION

RELATED APPLICATIONS

The present application is related to co-filed U.S. patent application Ser. No. 12/953,285 entitled "Process of Finding Out if Software Will Run on an Operating System Without Installing That Software" and U.S. patent application Ser. No. 12/953,286 entitled "Find and Track Information of Interface Usage of Software Libraries by Other Software" and U.S. patent application Ser. No. 12/953,084 entitled "Mechanism for Determining Support Criteria for Shared Libraries Based on Their Priority Levels", which are assigned to the assignee of the present application.

TECHNICAL FIELD

The embodiments of the invention relate generally to software compatibility and, more specifically, relate to providing a mechanism for providing customized visualization of Application Binary Interface/Application Programming Interface-related information.

BACKGROUND

Multiple software programs that run on a computing device often share libraries provided by the based operating system employed at the computing device. For example, these libraries can be used by the software programs to access various library or operating system functions (e.g., reading files, writing files, file management, network communications, inter-process communications, memory management, string manipulations, user interface manipulations, mathematics functions, etc.). Typically, these libraries change when the operating system changes or is updated; for example, upgrading to a newer version of an operating system can change the functions presented in one or more shared libraries, change versions and arguments used in these functions, and/or change functionalities of some, none or all of the library functions. As a result, a software program developed for one operating system may not work on another operating system and, similarly, upgrading to the new operating system may cause a software program not to work on the new or updated operating system. To determine whether a software program is executable on a new or updated operating system, the software program is typically re-compiled to run on the new or updated operating system.

The aforementioned re-compiling and re-running of the software program is further complicated when multiple software programs are involved and further, they include customer-generated software programs (e.g., third-party software programs that are created and provided by sources independent of the one providing the operating system and shared libraries). Without having a way to calculate and visually present the importance of shared libraries, a user (e.g., software developer, system administrator, etc.) remains unaware as to which of the shared libraries are important to the multiple third-party software programs running on the operating system; consequently, by updating a shared library provided by the base operating system, the user risks breaking existing software and adding to inefficiency by wasting system resources.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
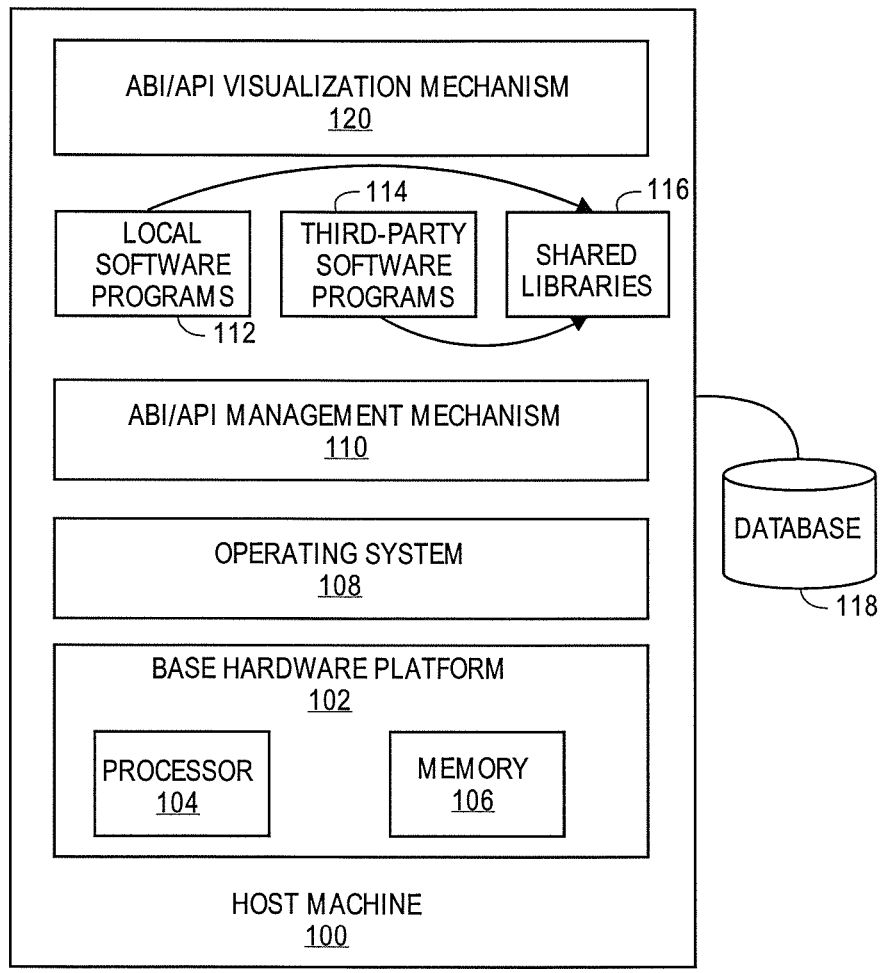
FIG. 1 illustrates a host machine employing application binary interface/application programming interface visualization mechanism according to one embodiment of the invention.

Embodiments of the invention provide a mechanism for providing customized visualization of Application Binary Interface-related information. A method of embodiments of the invention includes querying a database storing interface provisioning details and interface usage details relating to application binary interfaces (ABIs) associated with shared libraries provided by an operating system running on a computer system. The database further stores comparison results obtained from comparing the interface provisioning details with the interface usage details. The method further includes extracting a set of information from the database, and customizing visualization representation of the set of information. The set of information is composed of any part or all of the interface provisioning details, the interface usage details, and the comparison results.

The embodiments of the present invention are provided for determining support criteria for shared libraries based on their priority levels. ABIs/application programming interfaces (APIs) provisioning data (including a list of ABIs and APIs associated with shared libraries and their associated metadata) relating to software programs running on a computer system is extracted and stored on a database in communication with the computer system. Further, ABI/API usage detail of various ABIs and APIs being accessed and used by third-party software programs is detected and stored in the database. In one embodiment, ABI/API provisioning and usage details are compared with each other and then analyzed to determine priority levels of various shared libraries. These priority levels allow a user to assess a level of importance associated with each shared library.

In one embodiment, any combination or all of the provisioning and usage details, comparison results, importance levels, priority levels, and other relevant information, such as metadata, customer requests or history, shared libraries history or future anticipated use, predetermined criteria, etc. may be selected to be visualized in a customized manner using, for example, a graphical or chart-like display. These visual presentations of data, such as priority levels of shared libraries, may then be used by the provider to establish support criteria for the shared libraries, such as to provide a higher customer support for a library that has a high priority level as opposed to the one that is assigned a lower priority level. The provider uses the support criteria for shared libraries to address its customers' requests based on their changing needs and thus, to provide better customer services. Further, for example, the provider may choose to collect fees from its customers based on the support criteria they enjoy for the shared libraries used by their third-party software programs.

As will be discussed throughout this document, the provider here refers to a company or organization responsible for creating and providing the base operating system, the shared libraries, and local software programs, while a customer or third-party refers to a company or organization responsible for generating and providing the third-party software programs. Further, shared libraries and the related interfaces (e.g., ABI, API) may be accessed and used by one or more third-party software programs as well as by one or more local software programs that are part of the operating system and independent of the one or more third-party software programs. ABI and/or API refer to and may include data-identifying ABIs and/or APIs, such as those providing identifying names, locations, IDs, versions, etc. The user refers to a computer programmer or system administrator associated with the provider.

FIG. 1 illustrates a host machine 100 employing ABI/API visualization mechanism 120 according to one embodiment of the invention. Host machine 100 includes a base hardware platform 102 that comprises a computing platform, which may be capable, for example, of working with a standard operating system 108. Operating system 108 serves as an interface between any hardware or physical resources of the host machine 100 and a user. In some embodiments, base hardware platform 102 may include a processor 104, memory devices 106, network devices, drivers, and so on. Host machine 100 may include a server computing system or a client computing system. Further, terms like "machine", "device", "computer", and "computing system" are used interchangeably and synonymously throughout this document.

In one embodiment, host machine 100 employs ABI/API management mechanism 110 ("ABI/API mechanism") to manage ABIs and APIs and their associated metadata, such as the metadata that describes which shared library 116 provides which ABI and/or API and of what version along with identifying those Executable and Linkable Format (ELF)/binary files that consume them. ABI/API mechanism 110 detects and extracts the ABI/API metadata and stores it in a database 118. The ABI/API metadata, in one embodiment, includes ABI/API provisioning detail and ABI/API usage detail as will be described later in this document. The ABI/API provisioning detail, for example, includes the number of ABIs and/or APIs associated with each shared library 116 for various local software programs 112, the known use of such ABIs and APIs, various library or operating system functions associated with each ABI/API and the importance of each of those operating system functions, etc. On example of ABI/API provisioning detail includes a prominent shared library like glibc/libc.so.6 that provides an ABI strcmp which can be found in several applications and thus can be significantly important due to its high use frequency. The ABI/API usage detail, in one embodiment, includes the usage detail of each ABI and/or API and its associated shared library as it relates to each of the third-party software programs 114. For example, depending on the importance of a library or operating system function (e.g., something as simple as printing, deleting, etc.) to a third-party software program 114, an ABI and/or API associated with that operating function is expected to be frequently accessed and used by that third-party software program 114; hence, indicating the usage (and thus, the importance) of the ABI and/or API and its associated shared library 116. Further, shared libraries 116 and the related interfaces (e.g., ABI, API) may be accessed and used by one or more third-party software programs 114 as well as by one or more local software programs (e.g., including, but not limited to, local software programs 112) that are part of (and/or provided by the same host or provider that provided) the operating system and independent of the one or more third-party software programs. As aforementioned, ABI and/or API refer to and may include data-identifying ABIs and/or APIs, such as those providing identifying names, locations, IDs, versions, etc.

The database 118 includes a storage device that is either employed on the host machine 100 or remotely located on another machine that is in communication with the host machine 100. In one embodiment, ABI/API provisioning and usage details are then compared and analyzed by the ABI/API mechanism 110 to determine priority levels of various shared libraries 116. These priority levels may then be used by the provider (e.g., organization or company that creates and/or provides the operating system 108, the shared libraries 118, the local software program 112, etc.) to establish support criteria for the shared libraries 116 (such as to provide better customer support criteria for a shared library that has a high priority level as opposed to the one that is assigned a lower priority level) to address and satisfy its customers' changing requests and needs. Shared libraries 116 refer to those libraries that are accessed and used by both the local and third-party software programs 112, 114 to perform various operating system or library functions (e.g., reading files, writing files, file management, network communications, inter-process communications, memory management, string manipulations, user interface manipulations, mathematics functions, etc.).

In one embodiment, host machine 100 further employs ABI/API visualization mechanism 120 to provide visualization of any of the ABI/API-related data. In one embodiment, the ABI/API visualization mechanism 120 is versatile in providing visualization (e.g., graphical representation) of any combination of or all of the information obtained and/or processed using the ABI/API mechanism 110. For example, the ABI/API visualization mechanism 120 may be used to provide a visual representation of one or more of ABI/API provisioning details, ABI/API usage details, operating system functions, shared library importance levels, shared library priority levels, shared library support criteria policy recommendations, information extracted from ABI/API-related metadata, number of shared libraries per various versions of a software package (e.g., Red Hat package manager package manager (RPM)—a recursive acronym) per various microprocessors, number of ABIs and/or APIs per library, customer requests or history, shared library history or anticipated future use, and the like. Further, as aforementioned, the visual representation may include a graphical or chart-like representation, such as a column graph, a line graph, a pie graph, a bar graph, an area graph, a scatter graph, a stock graph, a doughnut graph, a surface graph, a radar graph, a bubble graph, etc.

As is known in the art, a library is a collection of classes and subroutines that are used to develop and support software programs, such as representing code and data that provide services to both local and other independent software programs 112, 114. For example, an operating system 108 provides shared libraries 116 to implement aforementioned system functions that are used by various local and third-party software programs 112, 114. Other libraries may be provided by and specific to third-party software programs 114 created and provided by third-party providers (e.g., a third-party software development company or organization other than the provider responsible for creating and providing the operating system 108 and the shared libraries 116).

Each library provides a collection or group of ABIs. An ABI represents a compiled binary form of a function serving as a low-level interface between software programs 112, 114 and the operating system 108. When a function is broken, such as a print function (such as when a print command executes double prints or does not print the entire text (e.g., prints "hell" when asked to print "hello")), etc., the broken function indicates a possible problem with the corresponding ABI and the associated library. In one embodiment, an ABI may include details relating to data types, sizes, alignments, calling conventions, symbol versions, system call numbers, binary format of object files, etc. An API refers to a library including routines to call, data structures to manipulate, and/or object classes to use, etc. Although ABI and API are referenced together as "ABI/API" throughout this document, it is contemplated that the ABI/API mechanism 110 may be used with ABIs and/or APIs, as necessitated or desired.

As aforementioned, a third-party or customer software program 114 represents a software program that is developed by someone other than the provider that produces the operating system 108 and the shared libraries 116. For example, a third-party software program 114 may include a special-purpose software program that is used for or by an organization (e.g., media development software for media companies, specialized modeling software, etc.) and, like a local software program 112, accesses and uses any number of shared libraries 116 to utilize system functions.

Figure 2:
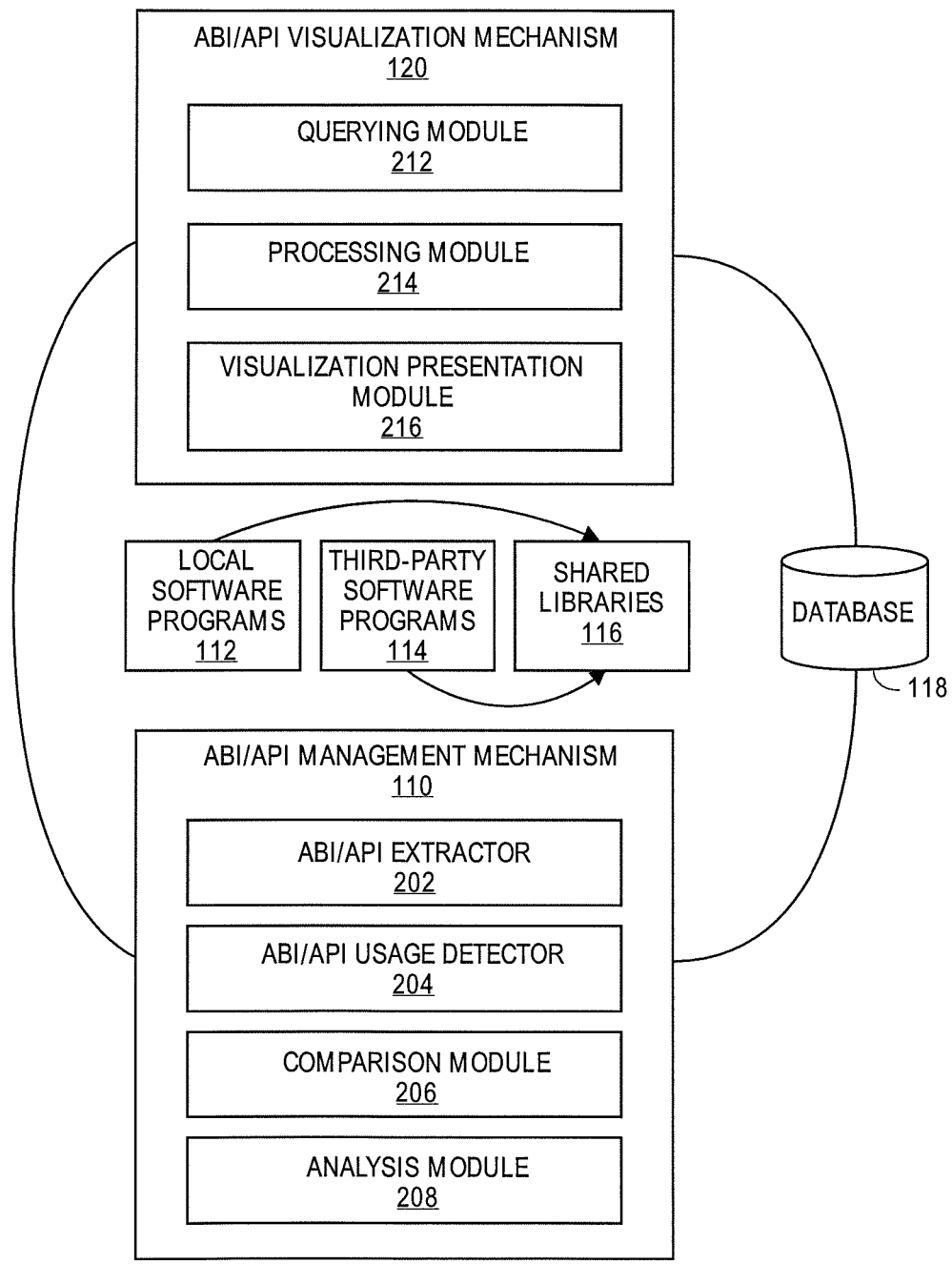
FIG. 2 illustrates an application binary interface/application programming interface visualization mechanism according to one embodiment of the invention.

FIG. 2 illustrates ABI/API visualization mechanism 120 according to one embodiment of the invention. In one embodiment, ABI/API mechanism 110 extracts provisioning details of various ABIs and APIs relating libraries 116 as accessed and used by various local and third-party software programs 112, 114. The provisioning details include, for example and as aforementioned, the number of ABIs and/or APIs associated with each shared library 116 for various local software programs 112, the known use of such ABIs and APIs, various library or operating system functions associated with each ABI/API and the importance of each of those operating system functions, etc. In one embodiment, ABI/API mechanism 110 stores the ABI/API provisioning detail in a database 118 so it can be used for comparison and analysis for assigning priority levels to various shared libraries 116. These priority levels are then used by the provider to form support criteria for each shared library 116 and provide them to its customers (e.g., third-party software program providers) so the third-party software programs 114 can have an improved and more efficient run on the operating system.

In one embodiment, ABI/API extractor 202 finds and extracts ABIs and/or APIs associated with various operating system functions associated with and provided by the shared libraries 116. ABIs and APIs may generally refer to data identifying names, locations, IDs, versions, etc. ABI/API extractor 202, in one embodiment, using, for example, a library controller or installer, scans through the base operating system, the local software programs 112, and the shared libraries 116 to find and extract their ABIs and/or APIs and any metadata associated with them. Metadata may refer to various versions of any given ABI, API and/or library and where they come from, such as ndx, value, bind value, whether they are internal or not, type of ABI/API/library, etc. ABI/API extractor 202, in one embodiment, using, for example, a library controller or installer, scans through the base operating system, the local software programs 112, and the shared libraries 116 to find and extract their ABIs and/or APIs and any metadata associated with them. These extracted ABIs and/or APIs and the associated metadata are organized as ABI/API provisioning detail and stored in the database 118.

Similarly, in one embodiment, ABI/API usage detector 204 detects the use of various shared libraries 116 by third-party software programs 114. For example, ABI/API detector checks the various ABIs and/or APIs associated with various system functions that are important to the third-party software programs 114 or monitors the access and use of relevant ABIs and/or API that are accessed and used by the third-party software programs 114 to perform the important system functions. The information can then be used to determine which of the shared libraries 116 are important to the third-party software programs 114. Once the ABI/API usage detail is detected, it is then stored in the database 118. In one embodiment, the importance of a shared library 116 depends on the usage frequency of an ABI/API based on its association with a library or operating system function. For example, if a third-party software program 114 is known for printing documents, then that third-party software program 114 is expected to use a particular library function that relates to printing (e.g., print library function) with a greater frequency than many of the other library functions and even more than by some of the other third-party software programs 114. The aforementioned monitoring of the ABIs/APIs can tell us the important of a particular ABI/API, such as in this example, an ABI/API that is associated with a shared library 116 that relates to the print library function. Similarly, the use of other library or operating system functions (and consequently, the use of their associated ABIs/APIs) can be monitored, and from the monitoring data, the importance of such ABIs/APIs can be determined; for example, the higher the usage of an ABI/API, the higher the importance of a shared library 116 associated with that ABI/API and vice versa. In one embodiment, the aforementioned monitoring of ABIs and/or APIs may be performed by scanning a software code of the local and/or third-party software programs 112, 114, or in real-time while executing the local and/or third-party software programs 112, 114. One example of a monitoring technique includes keeping the usage detail of ABIs/APIs by a local or third-party software and adding a new software into a list to check after regular intervals whether they are still using the same ABI/API or not. Further, an in-between check is performed to determine whether there is any breakage in the ABI/API.

In one embodiment, a comparison module 206 compares the ABI/API provisioning detail with the ABI/API usage detail to determine the importance level of each shard library 116 as it relates to one or more system functions that are important to and used by one or more of the third-party software programs 114. For example, of the shared libraries 116, those shared libraries that relate to those library functions that more frequently used by various third-party software programs 114 are regarded as more important than those shared libraries that are associated with those library functions that are less frequently used or not used at all by the third-party software programs 114. Although it is not necessary that an important threshold be assigned to a shared library 116, in one embodiment, a user may set one or more threshold levels to classify importance of shared libraries 116. For example, a first shared library 116 that is used more than 200 times by any of the third-party software programs 114 and/or by more than 5 third-party software programs 114 may be regarded as extremely important, while a second shared library 116 that is used 150-199 times and/or by 4 third-party software programs 114 may be classified as important, and similarly, a third shared library 116 that is used 100-149 times and/or by 3 third-party software programs may be regarded as moderately important, and so forth. It is contemplated that these classifications or threshold levels as well as other factors (e.g., customer history, customer needs, etc.) may be taken into consideration when forming support criteria for shared libraries 116. In one embodiment, the comparison of the ABI/API provisioning detail with the ABI/API usage detail points out the importance of each shared library 116 based on its access and use by one or more of the third-party software programs 114 (as represented by an ABI and/or API corresponding to a system function). The comparison results are stored in the database 118. It is contemplated that a particular third-party software program may provide various libraries that are exclusive to the execution of that particular third-party software program and may be part of a greater set of libraries but remain irrelevant to the shared libraries 116.

An analysis module 208, in one embodiment, analyzes the comparison results obtained from the ABI/API provisioning and usage details comparison performed by the comparison module 206. The analysis of the comparison results includes the analysis module 208 assigning a priority level to each shared library 116 according to its importance level gathered from the comparison results. For example, the higher the importance of a shared library 116 according to the comparison results, the higher the priority level assigned to it by the analysis module 208. Further, in one embodiment, the analysis module 208 includes intelligence and decision making component to recommend support criteria policies for the shared libraries 116 based on their assigned priority levels as well as one or more of user-defined predetermined criteria, customer requests, customer history, system bandwidth, and/or third-party software program usage history, etc. For example, using these recommended support criteria policies, the provider may decide to establish an extensive support criteria for those shared libraries that are identified as being frequency used, such as used by five or more of the third-party software programs 116, while establish a somewhat lesser support criteria for other less-popular shared libraries, or the like. Further, for example, certain large and often-used libraries (e.g., glibc) are known to be important, but using the ABI/API mechanism 110, even a relatively small and rarely-used library (e.g., lib.b.2, libfreedom, etc.) may also be determined to be important, for example, to a particular customer based on its third-party software program's use of that small library. Thus, having known the importance of this library, in one embodiment, the provider may choose to establish appropriate support criteria relevant to this library that is customized for the particular customer. For example, the provider may establish simpler and less expensive support criteria for less important shared libraries and/or customers with lesser needs, while put together more elaborate and extensive support criteria for more frequently used shared libraries and/or more demanding customers. In one embodiment, customizing comprises processing the set of information based on one or more of predetermined criteria, provider requests, customer requests, customer history, shared library usage history, shared library usage forecast, etc.

ABI/API visualization mechanism 120, in one embodiment, prepares a customized visual presentation of any set of the aforementioned ABI/API-related data (extracted from the database 118) in a graphical or chart-like form that is then provided to the provider. A user associated with the provider may use the visual presentation for, for example, decision-making purposes with regard to forming support criteria for shared libraries 116 for its customers, generating better future versions of their software packages, etc. In one embodiment, this ABI/API-related data visualization or visual presentation is based on one or more of predetermined criteria, provider requests, customer requests, customer history, shared library usage history, shared library usage forecast, or the like. For example, a user, on behalf of a provider, may request a visual representation of certain ABIs within certain versions of a particular software program for a particular customer (such as based on the customer's use history as it relates to the customer's use of these versions of the software program and more specifically, the use of these certain ABIs as they relate to various library or operating system functions).

In one embodiment, a querying module 212 of the visualization mechanism 120 queries the database 118 to extract any part or all of ABI/API-related data stored there by the ABI/API management mechanism 110. The query may include an active extraction or a passive reception of a part or all of the stored information from the database depending on, for example, predetermined criteria for such queries as set forth by the provider and/or in response to customer requests, customer history, shared library history, etc. The active extraction refers to the querying module 212 making an active extraction of any set of ABI/API-related information from the database 118 in response to an explicit request, such as a user request. The passive reception refers to an automatic reception of information from the database 118 either periodically, as set forth by the user, or automatically upon occurrence of an event (e.g., when a particular shared library 116 is used for a certain number of times and/or by a particular third-party software program 114) or completion of a preset time period. A processing module 214 then processes the queried data according to the provider query, such as the provider may request to visualize the progress of a particular entity over a number of years/versions of a software package (e.g., a number of ABIs provided by the shared libraries 116 as found in the year 2008, 2009 and 2010 versions of the software package). Once the queried data is processed for visualization, a presentation module 216 presents the processed data in the requested visualization form to a user via a display device. The data is then displayed by the display device.

Figure 3:
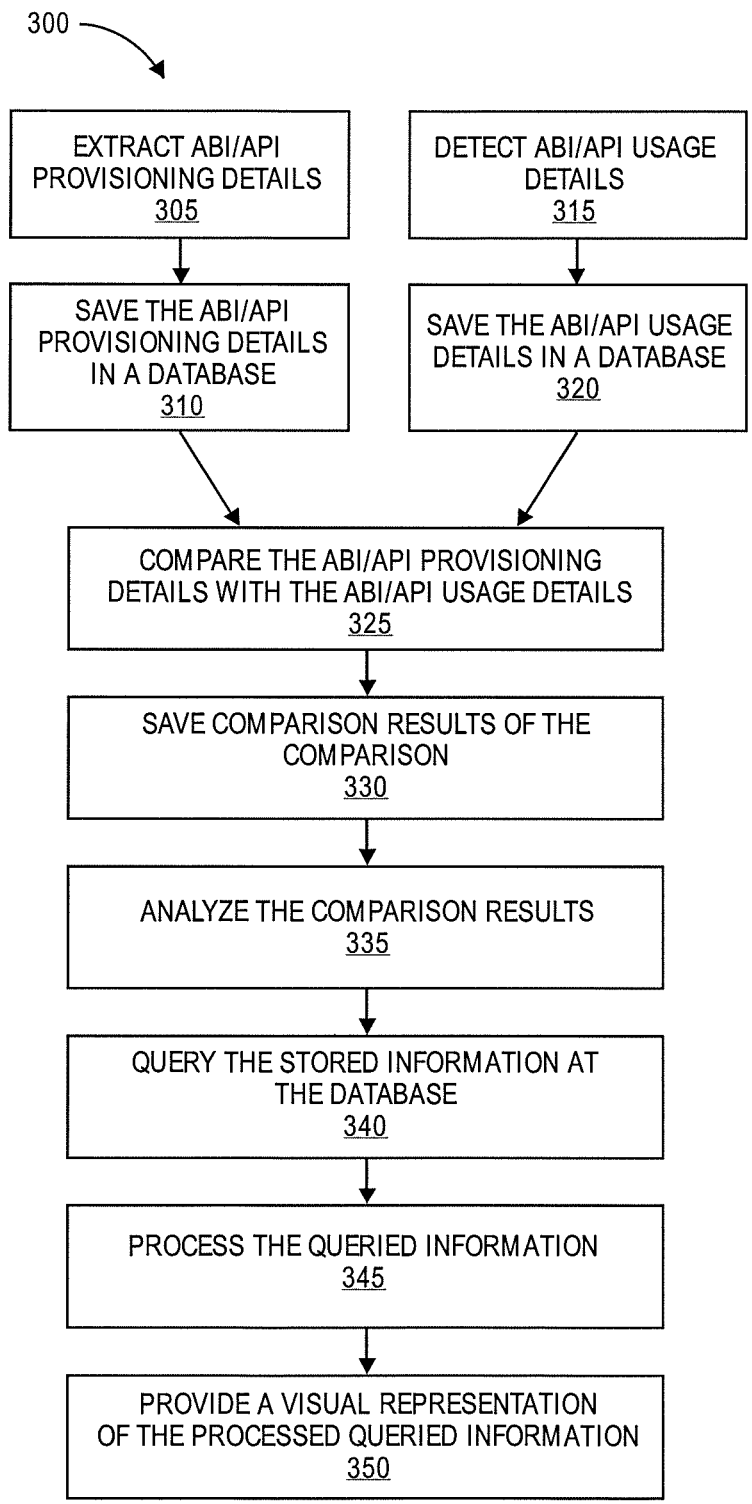
FIG. 3 illustrates a method for performing visualization of application binary interface/application programming interface-related information according to one embodiment of the invention.

FIG. 3 illustrates a method for performing visualization of ABI/API-related information according to one embodiment of the invention. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by ABI/API visualization mechanism of FIG. 1.

Method 300 starts at block 305 with finding and extracting of ABIs and APIs and their associated metadata by an ABI/API extractor. This ABI/API provisioning detail is then saved in a database at block 310. At block 315, usage detail of various ABIs and APIs associated with shared libraries as determined from their use by third-party software programs is detected. At block 320, this ABI/API usage detail is stored at the database. At block 325, in one embodiment, the ABI/API usage detail is compared with the ABI/API provisioning detail to determine the importance level of each shared library based, for example, on the frequency by with a shared library is accessed and used by any number of third-party software programs. At block 330, these comparison results are stored in the database.

At block 335, the comparison results are analyzed. These analyses include assigning a priority level to each shared library based on its determined importance level as set forth in the comparison results. As discussed previously, for example, a shared library may be assigned high importance if it is accessed and used by a large number of third-party software programs or frequently accessed and used by only a small number of third-party software programs. Further, importance and priority level may be directly proportional to each other; for example, the higher the importance of a shared library, the higher the priority level assigned to it.

At block 340, the stored information (e.g., ABI/API provisioning details, ABI/API usage details, comparison results, other relevant information, etc.) at the database is queried by the ABI/API visualization mechanism. In one embodiment, these queries to extract ABI/API-related data may be made into the database based on active extraction or passive reception as described with reference to FIG. 2. The queried information is processed for visual representation at block 345. At block 350, the processed information is then provided to a display device for a visual presentation (e.g., graphical representation). The visual representation, such as a pie graph, may be customized for the user, such as in response to a user request based on any number of factors, such as predefined criteria, customer requests and history, customer loyalty, shared library history and/or anticipated future use, etc. This visual representation of the data is used by the provider in determining and customizing support criteria for its customers.

Figure 4A:
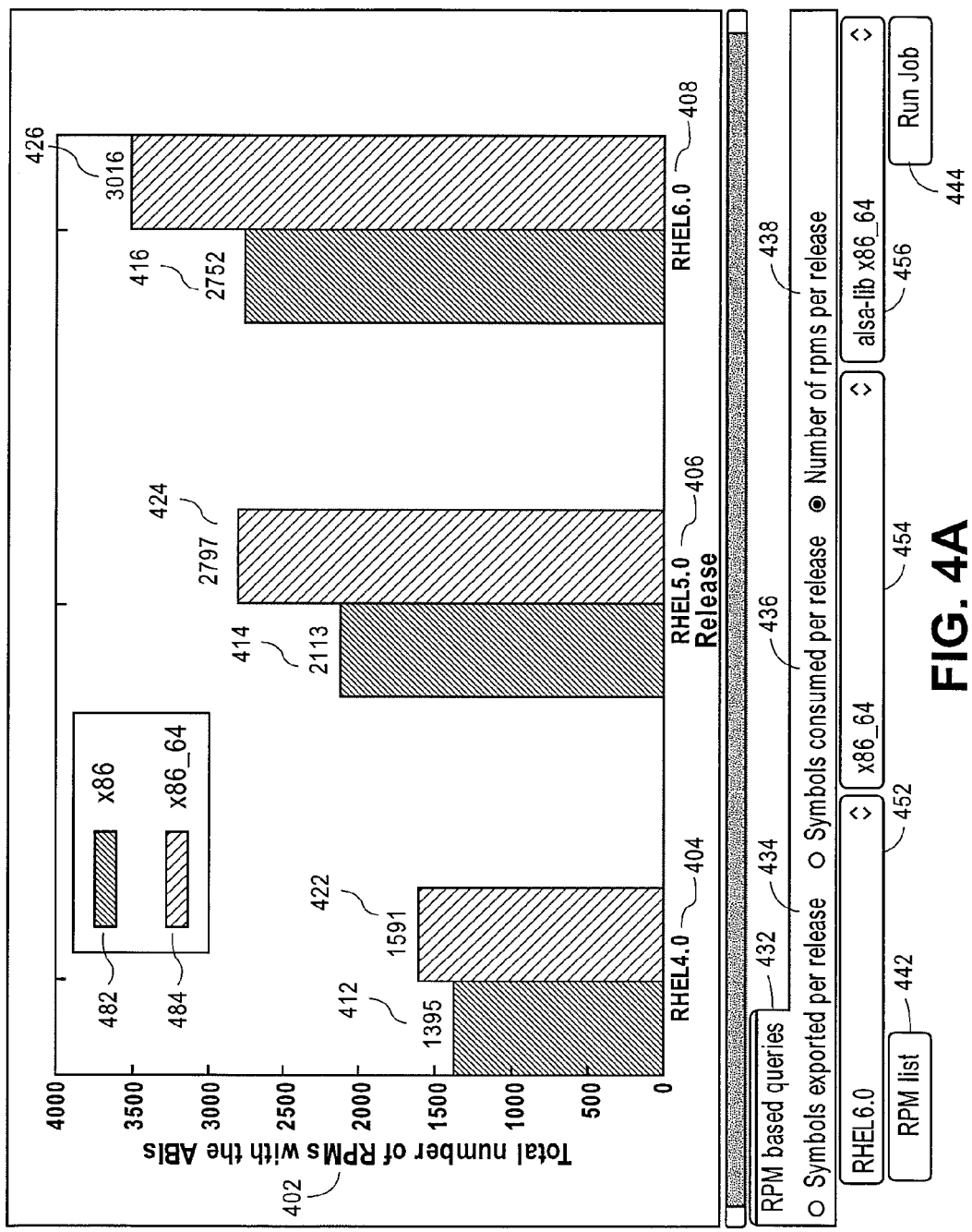
FIGS. 4A and 4B illustrate graphical representations of application binary interface/application programming interface-related data according to one embodiment of the invention.

FIG. 4A illustrates a graphical representation of ABI/API-related data according to one embodiment of the invention. In the illustrated bar graph representation, software packages (e.g., RPMs 402) with symbols (e.g., ABIs, APIs) 402 shown. The number of symbols, such as ABIs, 412-424, 422-426 is shown for various versions of a base operating system (e.g., Red Hat Enterprise Linux (RHEL) versions 4.0-6.0 404-408) as they relate to various processors, such as processor x86 482 and x86__64 484. For example, for processor x86 482, the number of software packages with ABIs increases from 1395 software packages 412 for base operating system version 4.0 404 to 2113 software packages 414 for base operating system version 5.0 406 to 2759 software packages 416 for base operating system version 6.0 408. Similarly, the number of software packages for base operating system 4.0 404 (i.e., 1395 software packages 412) for processor x86 482 can also be compared with the number of software packages for base operating system 4.0 404 for processor x86__64 484 (i.e., 1591 software packages 422). Near the bottom of the graphical representation screen, a user (representing the provider) is given various options, such as symbols (e.g., ABIs, APIs) exported per release 434, symbols consumed per release 436, and number of rpms per release 438 (the chosen option, as illustrated), to choose from within the option of software package based queries 432. Symbols, for example, refer to ABIs and/or APIs as referenced throughout this document. Further down additional options are provided, such as base operating system version 452, processor type 454, and library type 456. Further, update 442 and run 444 options are provided. Run 444 is used to draw the graph on the display screen.

RHEL refers to a Linux distribution (also referred to as GNU/Linux distribution) that is a member of Unix-like software distributions that are built on top of the Linux kernel. RPM Package Manager is a package management system and refers to software packaged in the .rpm file format, and the package manager itself. RPM was intended primarily for GNU/Linux distributions and its file format is regarded the baseline package format of the Linux Standard Base. It is contemplated that FIGS. 4A and 4B and their illustrated components and entities (e.g., RPM, RHEL, processors x86 482 and x86__64 484, etc.) are merely used here as examples for brevity and ease of understanding, and that the embodiments of the invention are independent of RPM, RHEL, processors 482 and 484, etc., and that the embodiments of the invention may relate to, work with, employ, and/or be employed on any type and number of computer systems, servers, platforms, workstations, processors, operating systems, local software programs, third-party software programs, and the like.

Figure 4B:
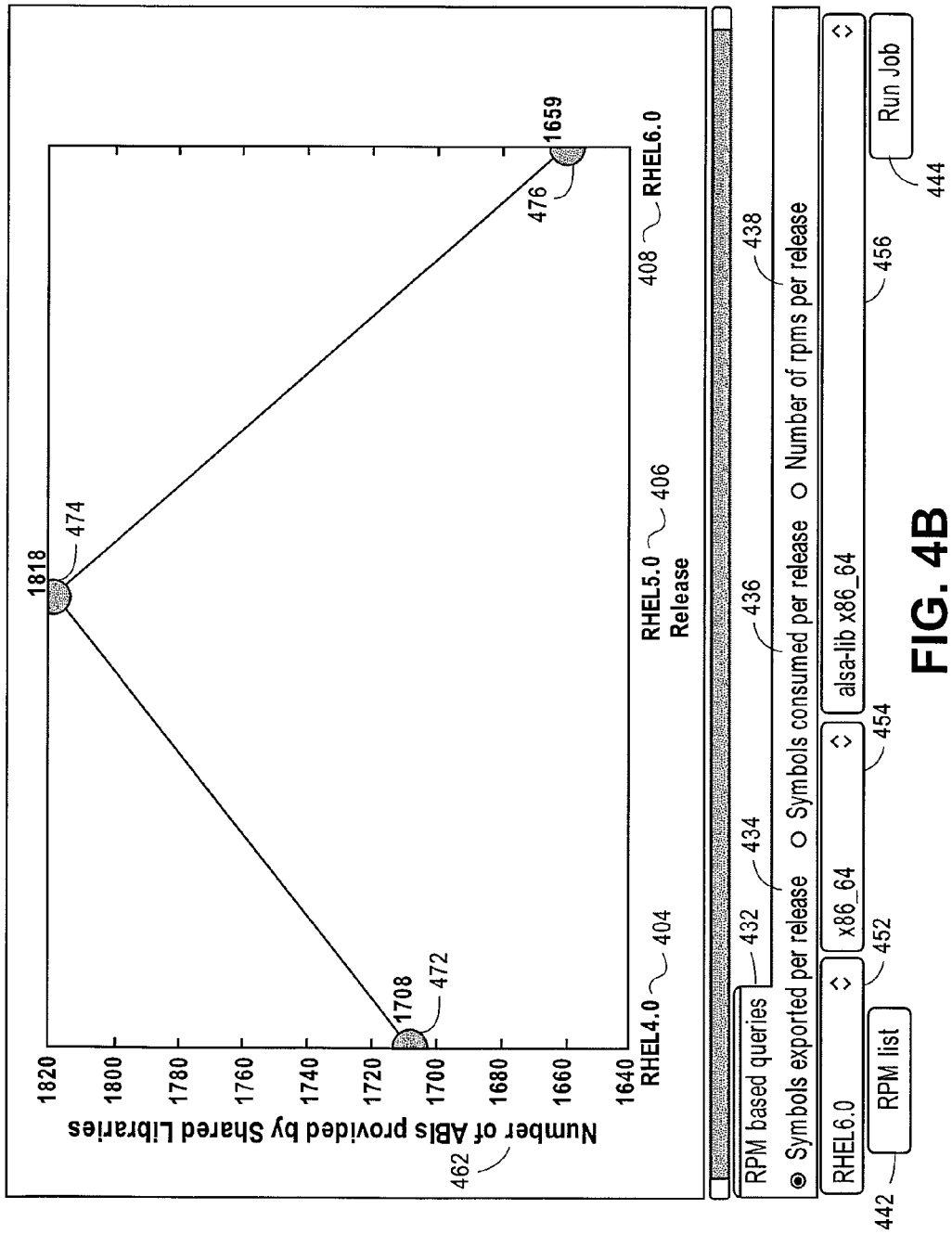

FIG. 4B illustrates another graphical representation of ABI/API-related data according to one embodiment. This line graphical representation illustrates a number of ABIs 462 provided within shared libraries of a base operating system of a computer system for various versions 404-408. As shown, this option 434 is chosen, which means symbols (e.g., ABIs) exported per release and selection of one RPM alsa-lib x86__64 484 version. For example, 1708 symbols (e.g., ABIs) exported 472 are shown for base operating system (e.g., RHEL) 4.0 404, 1818 ABIs for base operating system 5.0 406, and 1659 ABIs 476 for base operating system 6.0 408 are illustrated. In one embodiment, these visualization representations of FIGS. 4A and 4B can be used by the provider to better establish support criteria for the shared libraries to its customers, and plan future versions of the base operating system, shared libraries, ABIs, APIs, software programs and packages, etc. For example, the graphical representation shows the number of ABIs reducing to 1659 ABIs 476 for base operating system 6.0 from 1818 ABIs for base operating system 5.0 406, which indicates a possible problem (e.g., a block or removal of shared libraries or code sections, etc.) with the software package because, typically, the number of ABIs are expected to increase with each newer version of a software package as it evolves to include additional and/or updated features. Further, update 442 and run 444 options are provided. Run 444 is used to draw the graph on the display screen.

Figure 5:
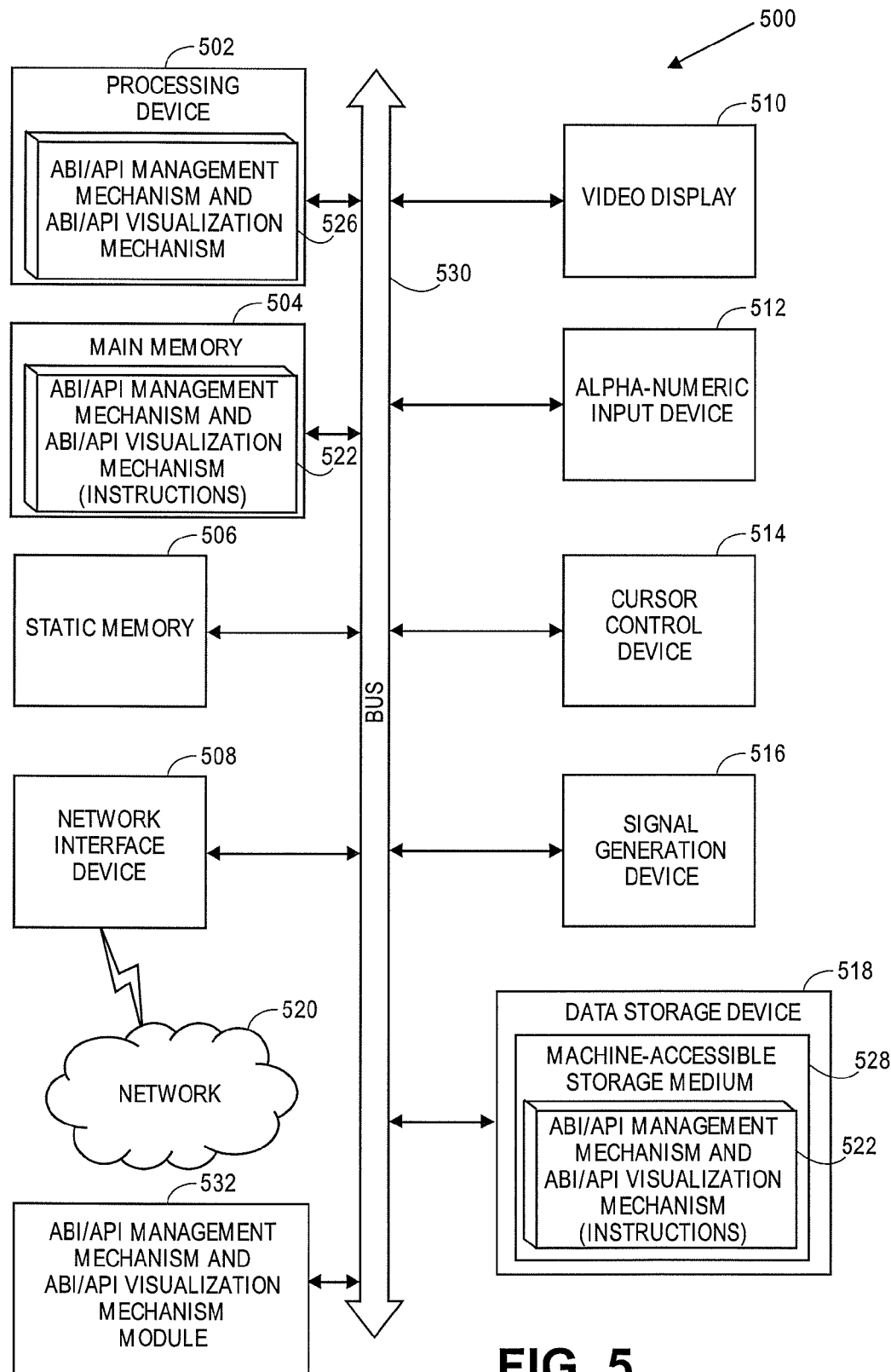
FIG. 5 illustrates a computing system according to one embodiment of the invention.

FIG. 5 illustrates a computing system 500 employing ABI/API management and visualization mechanisms according to one embodiment of the invention. Within the computing system 500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 500 includes a processing device 502, a main memory 504 (e.g., read-only memory (ROM), flash memory, RAM, dynamic RAM (DRAM) such as synchronous DRAM (SDRAM), DRAM (RDRAM), etc.), a static memory 506 (e.g., flash memory, static random access memory (SRAM), etc.), and a secondary memory 518 (e.g., a data storage device in the form of a drive unit, which may include fixed or removable machine-accessible or computer-readable storage medium), which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic 526 for performing the operations and methods discussed herein.

The computing system 500 may further include a network interface device 508. The computing system 500 also may include a video display unit 510 (e.g., a liquid crystal display (LCD) or a cathode ray tube (CRT)) connected to the computing system through a graphics port and graphics chipset, an alphanumeric input device 512 (e.g., a keyboard), a cursor control device 514 (e.g., a mouse), and a signal generation device 516 (e.g., a speaker).

The data storage device 518 may include a machine-accessible storage medium (or a computer-readable storage medium) 528 on which is stored one or more sets of instructions 522 (e.g., ABI/API management mechanism and ABI/API visualization mechanism) embodying any one or more of the methodologies or functions described herein. The ABI/API management and visualization mechanisms may also reside, completely or at least partially, within the main memory 504 (e.g., ABI/API management mechanism and ABI/API visualization mechanism (instructions) 522) and/or within the processing device 502 (e.g., ABI/API management mechanism and ABI/API visualization mechanism (processing logic) 526) during execution thereof by the computing system 500, the main memory 504 and the processing device 502 also constituting machine-readable storage media. Further, for example, ABI/API management mechanism and ABI/API visualization mechanism instructions 522 may be transmitted or received over a network 520 via the network interface device 508.

The machine-readable storage medium 528 may also be used to store the ABI/API management and visualization mechanisms (instructions) 522 persistently. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

ABI/API management mechanism and ABI/API visualization mechanism modules 532, components and other features described herein (for example in relation to FIG. 1) can be implemented as discrete hardware components or integrated in the functionality of hardware components such as ASICS, FPGAs, DSPs or similar devices. In addition, the modules 532 can be implemented as firmware or functional circuitry within hardware devices. Further, the modules 532 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "selecting", "extracting", "detecting", "comparing", "analyzing", "saving", "storing", "receiving", "monitoring", "communicating", "accessing", "providing", "facilitating", "visualizing", "querying", "displaying", "processing" or the like, refer to the action and processes of a computing system, or similar electronic computing device, that manipulates and transforms data represented as physical (electronic) quantities within the computing system's registers and memories into other data similarly represented as physical quantities within the computing system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computing system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computing system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
    maintaining, by a processing device, interface provisioning details and interface usage details relating to interfaces associated with shared libraries provided by an operating system, wherein the interface provisioning details comprise data identifying each of the interfaces associated with each of the shared libraries, wherein the interface usage details comprise data identifying access and use of the interfaces by software programs, and wherein the data identifying access and use of the interfaces by the software programs comprises frequencies with which the interfaces are accessed and used by the software programs;
    comparing the interface provisioning details and the interface usage details for each of the interfaces to generate a priority level for each of the shared libraries, wherein the priority level of each shared library in the shared libraries is generated in view of a frequency with which each of the interfaces associated with the shared library is accessed and used by the software programs as compared to frequencies with which others of the interfaces associated with others of the shared libraries are accessed and used by the software programs or in view of a number of the software programs that access and use each of the interfaces associated with the shared library as compared to numbers of the software programs that access and use others of the interfaces associated with others of the shared libraries; and
    generating a visual representation from a set of information comprising at least a portion of the interface provisioning details, the interface usage details, and the priority level of each of the shared libraries.

2. The method of claim 1, further comprising displaying the visual representation, wherein the visual representation comprises a graphical or chart-like display of the set of information.

3. The method of claim 1, wherein the interfaces further comprise application programming interfaces (APIs).

4. The method of claim 1, wherein generating comprises processing the set of information in view of one or more of predetermined criteria, provider requests, customer requests, customer history, shared library usage history, or shared library usage forecast.

5. The method of claim 4, wherein the provider requests are placed by a provider, wherein the provider comprises an entity to create and provide the operating system and the shared libraries.

6. The method of claim 5, wherein the provider is to customize support criteria for the shared libraries in view of, at least partially, the priority level of each shared library in the shared libraries.

7. The method of claim 6, wherein the support criteria are customized in view of, at least partially, one or more of customer requests, customer history, user-defined predetermined criteria, anticipated future use of the shared libraries, or historical use of the shared libraries.

8. The method of claim 1, wherein the interfaces correspond to operating system functions associated with the shared libraries, wherein the operating system functions relate to one or more of file accesses, networking capabilities, user interface functions, thread management, process management, or common utilities.

9. The method of claim 1, wherein the software programs comprise one or more local software programs that are part of the operating system and independent of one or more third-party software programs.

10. A system comprising:
    a memory to store instructions; and
    a processing device to communicate with the memory to execute the instructions, wherein the instructions cause the processing device to:
        maintain interface provisioning details and interface usage details relating to interfaces associated with shared libraries provided by an operating system, wherein the interface provisioning details comprise data identifying each of the interfaces associated with each of the shared libraries, wherein the interface usage details comprise data identifying access and use of the interfaces by software programs, and wherein the data identifying access and use of the interfaces by the software programs comprises frequencies with which the interfaces are accessed and used by the software programs;
        compare the interface provisioning details and the interface usage details for each of the interfaces to generate a priority level for each of the shared libraries, wherein the priority level of each shared library in the shared libraries is generated in view of a frequency with which each of the interfaces associated with the shared library is accessed and used by the software programs as compared to frequencies with which others of the interfaces associated with others of the shared libraries are accessed and used by the software programs or in view of a number of the software programs that access and use each of the interfaces associated with the shared library as compared to numbers of the software programs that access and use others of the interfaces associated with others of the shared libraries; and
        generate a visual representation from a set of information comprising at least a portion of the interface provisioning details, the interface usage details, and the priority level of each of the shared libraries.

11. The system of claim 10, wherein the processing device is further to display the visual representation, wherein the visual representation comprises a graphical or chart-like display of the set of information.

12. The system of claim 10, wherein the interfaces further comprise application programming interfaces (APIs).

13. The system of claim 10, wherein the processing device is to generate the visual representation by processing the set of information in view of one or more of predetermined criteria, provider requests, customer requests, customer history, shared library usage history, or shared library usage forecast.

14. The system of claim 13, wherein the provider requests are placed by a provider, wherein the provider comprises an entity to create and provide the operating system and the shared libraries.

15. The system of claim 14, wherein the provider is to customize support criteria for the shared libraries in view of, at least partially, the priority level of each shared library in the shared libraries.

16. A non-transitory machine-readable medium including instructions that, when executed by a processing device, cause the processing device to perform operations comprising:

maintaining, by the processing device, interface provisioning details and interface usage details relating to interfaces associated with shared libraries provided by an operating system, wherein the interface provisioning details comprise data identifying each of the interfaces associated with each of the shared libraries, wherein the interface usage details comprise data identifying access and use of the interfaces by software programs, and wherein the data identifying access and use of the interfaces by the software programs comprises frequencies with which the interfaces are accessed and used by the software programs;

comparing the interface provisioning details and the interface usage details for each of the interfaces to generate a priority level for each of the shared libraries, wherein the priority level of each shared library in the shared libraries is generated in view of a frequency with which each of the interfaces associated with the shared library is accessed and used by the software programs as compared to frequencies with which others of the interfaces associated with others of the shared libraries are accessed and used by the software programs or in view of a number of the software programs that access and use each of the interfaces associated with the shared library as compared to numbers of the software programs that access and use others of the interfaces associated with others of the shared libraries; and generating a visual representation from a set of information comprising at least a portion of the interface provisioning details, the interface usage details, and the priority level of each of the shared libraries.

17. The non-transitory machine-readable medium of claim 16, wherein the operations further comprise displaying the visual representation, wherein the visual representation comprises a graphical or chart-like display of the set of information.

18. The non-transitory machine-readable medium of claim 16, wherein the interfaces further comprise application programming interfaces (APIs).

19. The non-transitory machine-readable medium of claim 16, wherein generating comprises processing the set of information in view of one or more of predetermined criteria, provider requests, customer requests, customer history, shared library usage history, or shared library usage forecast.

20. The non-transitory machine-readable medium of claim 19, wherein the provider requests are placed by a provider, wherein the provider comprises an entity to create and provide the operating system and the shared libraries.

* * * * *